United States Patent
Blangero et al.

(10) Patent No.: US 10,644,312 B2
(45) Date of Patent: May 5, 2020

(54) PRECURSOR AND METHOD FOR PREPARING LI TRANSITION METAL OXIDE CATHODES FOR RECHARGEABLE BATTERIES

(71) Applicants: Umicore, Brussels (BE); Umicore Korea Ltd., Chungnam (KR)

(72) Inventors: Maxime Blangero, Cheonan (KR); DongGun Park, Seoul (KR); Jens Paulsen, Daejeon (KR); Jing Zhang, Cheonan (KR)

(73) Assignees: UMICORE, Brussels (BE); UMICORE KOREA, LTD., Chungnam (KR)

( * ) Notice: Subject to any disclaimer, the term of this patent is extended or adjusted under 35 U.S.C. 154(b) by 0 days.

(21) Appl. No.: 15/757,035

(22) PCT Filed: Aug. 25, 2016

(86) PCT No.: PCT/IB2016/055063
§ 371 (c)(1),
(2) Date: Mar. 2, 2018

(87) PCT Pub. No.: WO2017/042655
PCT Pub. Date: Mar. 16, 2017

(65) Prior Publication Data
US 2019/0074511 A1    Mar. 7, 2019

(30) Foreign Application Priority Data
Sep. 8, 2015 (EP) ..................... 15184206

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *C01G 53/50* (2013.01); *H01M 4/505* (2013.01);
(Continued)

(58) Field of Classification Search
CPC ................. H01M 4/525; H01M 4/505; H01M 2004/028; H01M 4/131; H01M 10/0525;
(Continued)

(56) References Cited

U.S. PATENT DOCUMENTS 8,673,170 B2 * 3/2014 Levasseur .............. C01G 51/42
252/182.1
2002/0110518 A1    8/2002 Okuda et al.
(Continued)

FOREIGN PATENT DOCUMENTS

CN    103392251 A    11/2013
EP    0872450 A1    10/1998
(Continued)

OTHER PUBLICATIONS

EPO, Supplementary European Search Report for Patent Application No. EP 16 84 3752, dated Mar. 8, 2019.
(Continued)

*Primary Examiner* — Andrew J. Oyer
(74) *Attorney, Agent, or Firm* — NK Patent Law

(57) ABSTRACT

A crystalline precursor compound is described for manufacturing a lithium transition metal based oxide powder usable as an active positive electrode material in lithium-ion batteries, the precursor having a general formula $Li_{1-a}((Ni_z(Ni_{1/4}Mn_{1/4})_yM'_x)_{1-k}A_k)_{1+a}O_2$, wherein $x+y+z=1$, $0<x\leq 0.2$, $0.55<z\leq 0.90$, M' is either one or both of Co and Al, A is a dopant, $0\leq k\leq 0.1$, and $0.05\leq a\leq 0.40$, wherein the precursor an integrated intensity ratio I003/I104<1, wherein I003 and I104 are the peak intensities of the Bragg peaks (003) and
(Continued)

(104) of the XRD pattern of the crystalline precursor compound. Also a method is described for manufacturing a positive electrode material having a general formula $Li_{1-a}M_{1-a}O_2$, with $M=(Ni_z(Ni_{1/2}Mn_{1/2})_y M'_x)_{1-k} A_k)$, wherein $x+y+z=1$, $0<x\leq0.2$, $0.55<z\leq0.90$, M' is either one or both of Co and Al, A is a dopant, $0\leq k\leq0.1$ and $0.01<a'<0.10$ by sintering the crystalline precursor compound in an oxidizing $CO_2$-free atmosphere at a temperature T between 750 and 950° C., for a time t between 6 and 36 hrs.

11 Claims, 7 Drawing Sheets

(51) Int. Cl.
  *H01M 4/505* (2010.01)
  *H01M 4/131* (2010.01)
  *H01M 4/02* (2006.01)
  *H01M 10/0525* (2010.01)

(52) U.S. Cl.
  CPC ...... *C01P 2002/50* (2013.01); *C01P 2002/52* (2013.01); *C01P 2002/60* (2013.01); *C01P 2002/72* (2013.01); *C01P 2002/74* (2013.01); *C01P 2004/51* (2013.01); *C01P 2004/52* (2013.01); *C01P 2006/40* (2013.01); *H01M 4/131* (2013.01); *H01M 2004/028* (2013.01)

(58) Field of Classification Search
  CPC ..... C01G 53/50; C01G 53/42; C01P 2006/40; C01P 2002/72; C01P 2002/52; C01P 2002/50; C01P 2004/52; C01P 2002/74; C01P 2004/51; C01P 2002/60; Y02E 60/122; Y02P 70/54
  See application file for complete search history.

(56) References Cited

U.S. PATENT DOCUMENTS

| | | | |
|---|---|---|---|
| 2006/0233696 A1* | 10/2006 | Paulsen | ............... C01G 53/006 423/594.4 |
| 2009/0309063 A1 | 12/2009 | Paulsen | |
| 2012/0104311 A1 | 5/2012 | Levasseur et al. | |
| 2014/0054495 A1 | 2/2014 | Paulsen | |
| 2015/0010824 A1 | 1/2015 | Sun | |
| 2015/0147653 A1 | 5/2015 | Nomura et al. | |

FOREIGN PATENT DOCUMENTS

| | | | |
|---|---|---|---|
| JP | 2002175808 | A | 6/2002 |
| JP | 2007280723 | A | 10/2007 |
| JP | 2012014851 | A | 1/2012 |
| JP | 20120518871 | A | 8/2012 |
| JP | 2015015263 | A | 1/2015 |
| KR | 20070109878 | A | 11/2007 |
| KR | 20130116315 | A | 10/2013 |
| WO | 2014142281 | A1 | 2/2017 |

OTHER PUBLICATIONS

Chang, Zhaorong, Synthesis and Characterization of Nonspherical LiCoO2 with High Tap Density by Two-Step Drying Method, Electrochemical and Solid-State Letters, 2008, pp. A229-A232, vol. 11 (12).

Williamson, G.K., X-ray Line Broaodening From Filed Aluminum and Wolfram, Acta Metallurgica, pp. 22-31, Jan. 1953, vol. 1.

PCT International Search Report for PCT/IB2016/055063, dated Dec. 13, 2016.

Taiwan IPO Search Report for Taiwan Patent Application No. 105127703 dated Apr. 6, 2017.

* cited by examiner

PRECURSOR AND METHOD FOR PREPARING LI TRANSITION METAL OXIDE CATHODES FOR RECHARGEABLE BATTERIES

This application is a National Stage application of International Application No. PCT/IB2016/055063, filed Aug. 25, 2016. This application also claims priority to European Application No. EP15184206.9, filed Sep. 8, 2015.

TECHNICAL FIELD AND BACKGROUND

This invention relates to a precursor of and a method to prepare high-Ni "NMC" cathode powdery material at large scale and at low cost. By "NMC" we refer to lithium-nickel-manganese-cobalt-oxide. The high-Ni NMC powder can be used as a cathode active material in Li-ion rechargeable batteries. Batteries containing the cathode materials of the invention yield better performances, such as a higher cycle stability and a low content of soluble base.

Currently rechargeable Li-ion batteries start penetrating the "large" rechargeable battery market. Here, "large batteries" refers to applications such as automotive batteries, as well as stationary power stations. These large stationary or automotive batteries are much larger than previous dominating batteries for portable applications, like cylindrical cells for notebooks or polymer cells for smartphones. Therefore there are fundamentally different requirements for the "large battery" cathode materials, not only performance-wise, but also from the point of resource scarcity. Previously the majority of rechargeable lithium batteries used $LiCoO_2$ (LCO) as cathode material. $LiCoO_2$ is not sustainable for large batteries due to limited cobalt resources—as already today about 30% of the earth's available cobalt is used for batteries, according to the Cobalt Development Institute. The situation is less critical for the so-called NMC cathode materials. Examples are "442" and "532" cathode materials; 442 generally referring to $Li_{1+x}M_{1-x}O_2$ with x=0.05 and $M=Ni_{0.4}Mn_{0.4}Co_{0.2}$; and 532 generally referring to $LiMO_2$ with $M=Ni_{0.5}Mn_{0.3}Co_{0.2}$. The NMC cathode materials contain less cobalt since it is replaced by nickel and manganese. Since nickel and manganese are cheaper than cobalt and relatively more abundant, NMC potentially replaces $LiCoO_2$ in large batteries. Other candidates as olivines ($LiFePO_4$) are less competitive because of the much lower energy density compared to NMC.

A NMC cathode material can roughly be understood as a solid state solution of $LiCoO_2$, $LiNi_{0.5}Mn_{0.5}O_2$ and $LiNiO_2$. In $LiNi_{0.5}Mn_{0.5}O_2$ Ni is divalent, in $LiNiO_2$ Ni is trivalent. At 4.3 V the nominal capacity for $LiCoO_2$ and $LiNi_{0.5}Mn_{0.5}O_2$ is about 160 mAh/g, against 220 mAh/g for $LiNiO_2$. The reversible capacity of any NMC compound can be roughly estimated from these given capacities. For example NMC 811 can be understood as 0.1 $LiCoO_2$+0.2 $LiNi_{0.5}Mn_{0.5}O_2$+0.7 $LiNiO_2$. Thus the expected capacity equals 0.1×160+0.2×160+0.7×220=202 mAh/g. The capacity increases with "Ni excess" where "Ni excess" is the fraction of 3-valent Ni; in NMC 811 the Ni excess is 0.7 (if we assume lithium stoichiometry with Li:(Ni+Mn+Co)=1.0). Obviously the capacity increases with Ni excess, so that at the same voltage, Ni-excess NMC possesses a higher energy density than LCO, which means less weight or volume of cathode material is required for a certain energy demand when using Ni-excess NMC instead of LCO. Additionally due to the lower price of nickel and manganese—compared to cobalt—the cost of cathode per unit of delivered energy is much reduced. Thus, the higher energy density and lower cost of Ni-excess NMC—by contrast to LCO—is more preferred in the "large battery" market.

A simple and cheap manufacturing process of NMC cathode material is required for a large-scale application. Such a typical process—which we call direct sintering—is the firing of a blend of a mixed metal precursor (for example $M(OH)_2$ precursor) and a lithium precursor (for example $Li_2CO_3$) in trays, in a continuous manner. Trays with blends are continuously fed into a furnace, and during the movement through the furnace the reaction towards the final sintered $LiMO_2$ proceeds. The firing cost depends strongly on the thru-put of the firing process. The faster the trays move across the furnace (referred to as the "firing time") and the more blend the trays carry (referred to as the "tray load") the higher the thru-put of the furnace is. A furnace has a high investment cost, therefore, if the thru-put is small, the furnace depreciation significantly contributes to the total process cost. In order to achieve a cheap product, a high thru-put is thus desired.

As the capacity of NMC material increases with Ni excess, high "Ni-excess" cathode materials, like NMC 622 (e.g. $LiNi_{0.6}Mn_{0.2}Co_{0.2}$), NMC 811 (e.g. $LiNi_{0.8}Mn_{0.1}Co_{0.1}$), and also NCA (e.g. $LiNi_{0.8}Co_{0.15}Al_{0.05}$) possess a much higher capacity in batteries than with less Ni, as for example NMC 111 (being $LiMO_2$ with $M=Ni_{1/3}Mn_{1/3}Co_{1/3}$). However, the production becomes more and more difficult with increasing Ni content. As an example—very high Ni-excess cathode materials like NCA (which is $LiNi_{0.8}Co_{0.15}Al_{0.05}$) cannot be prepared in air or using $Li_2CO_3$ as Li precursor. Because of the low thermodynamic stability of Li in high-Ni material the preparation occurs in $CO_2$-free oxidizing gas (typically oxygen) and as lithium precursor LiOH is used instead of the cheaper $Li_2CO_3$. Contrary to this, the low Ni NMC111 can easily be prepared in normal air and using a $Li_2CO_3$ precursor. As Ni increases NMC tends to have a low air stability, and it is more difficult to obtain a cathode with low content of soluble base. The concept of "soluble base" is more explicitly discussed in WO2012-107313.

A promising Ni-excess NMC is NMC 622, potentially having a much higher capacity but at the same time the production is definitely harder than NMC 111. Even if it might still be feasible to produce NMC 622 by direct sintering, it is difficult to prepare NMC 622 at large scale at low cost in an efficient way. The problems of large production mainly originate from the high soluble base content in the final NMC product. The soluble base refers to the surface impurities like $Li_2CO_3$ and LiOH, and in this case the $Li_2CO_3$ impurity is of most concern. As discussed in U.S. Pat. No. 7,648,693, these bases may come from unreacted reagents of lithium sources, usually $Li_2CO_3$ or $LiOH.H_2O$, where $LiOH.H_2O$ normally contains 1 wt % $Li_2CO_3$ impurity. These bases may also come from the mixed transition metal hydroxides that are used as transition metal source in the production. A mixed transition metal hydroxide is usually obtained by co-precipitation of transition metal sulfates and an industrial grade base such as NaOH. The base contains a $CO_3^{2-}$ impurity in the form of $Na_2CO_3$. In the case of high Ni-excess NMC, like NMC 622, after sintering at high temperature, the carbonate compounds remain on the surface of the final product. The problems with the soluble base increase further for NMC compounds with even higher Ni content, like 7/1.5/1.5, 811 or NCA. The soluble base content can be measured by a technique called pH titration, as discussed in U.S. Pat. No. 7,648,693.

The presence of soluble base content in the final NMC material could cause a serious gas generation in full cells, which is usually called "bulging" in full cell tests. Serious gas generation or bulging issues will result in a bad cycling life of the battery together with safety concerns. Therefore, in order to use high Ni-excess NMC material for large battery applications, an effective and cheap processing method is necessary that avoids such high soluble base content. Additionally it is observed that the deterioration of cyclability in NMC material is related to the above-mentioned presence of $Li_2CO_3$.

A process to prepare NMC 622 or NMC 811 with low $Li_2CO_3$ soluble base—as is disclosed in US2015-010824— runs as follows: $LiOH.H_2O$ with low $Li_2CO_3$ impurity as Li source, is blended with mixed transition metal hydroxide at target composition, and sintered at high temperature under an air atmosphere. In this process, the base content of such high Ni-excess NMC final product is much reduced, but the manufacturing cost is relatively high due to the higher price of pure $LiOH.H_2O$ compared to a $Li_2CO_3$ precursor. This conflicts with the low cost benefit of substituting LCO by NMC material, where, as said before, a cheap and simple production process is essential to replace LCO.

U.S. Pat. No. 7,648,693 proposes a "split" method, where the direct sintering is conducted in two steps: a first lithiation at relatively low temperature, like 700° C., and a second step of sintering at a higher temperature. In this patent, a large-scale preparation of $LiMO_2$ with $M=Ni_{4/15}(Mn_{1/2}Ni_{1/2})_{8/15}Co_{0.2}$ is achieved with a final product that is almost free of soluble base. The cycling stability of that NMC material is also improved. The "split" method is thus a potential way to prepare NMC 622 or 811 free of soluble base and at low cost. However, it has been found that this "split" method is not usable for the large scale production of high Ni excess NMC, with lithium carbonate as Li-precursor, as in U.S. Pat. No. 7,648,693 excessive amounts of preheated air have to be pumped through the reactor. Practically this processing method is limited for lower Ni-excess NMC, such as NMC 532.

Therefore, in order to replace LCO by very high Ni-excess NMC—like NMC 811—for the "large battery" market, it is the aim of the present invention to provide a cheap and efficient manufacturing process, where the high Ni-excess NMC can be produced at low cost, and without resulting in a too high soluble base content.

SUMMARY

Viewed from a first aspect, the invention can provide the following product embodiments:

Embodiment 1: A crystalline precursor compound for manufacturing a lithium transition metal based oxide powder usable as an active positive electrode material in lithium-ion batteries, the precursor having a general formula $Li_{1-a}((Ni_z(Ni_{1/2}Mn_{1/2})_yM'_x)_{1-k}A_k)_{1+a}O_2$, wherein x+y+z=1, 0<x≤0.2, 0.55<z≤0.90, M' is either one or both of Co and Al, A is a dopant, 0≤k≤0.1, and 0.05≤a≤0.40, wherein the precursor has an integrated intensity ratio I003/I104<1, wherein I003 and I104 are the peak intensities of the Bragg peaks (003) and (104) of the XRD pattern of the crystalline precursor compound. The precursor may have a layered crystal structure (r-3M) and may be basically single phase by XRD. It results also that the Li over metal molar ratio in the precursor compound is ≤0.90.

Embodiment 2: The precursor has a ratio R of the intensities of the combined Bragg peak (102,006) and the Bragg peak (101) with R=((I102+I006)/I101) and 0.5<R<1.16.

Embodiment 3: The crystalline precursor compound has a $Li_2CO_3$ content <0.4 wt %. Normally the $Li_2CO_3$ content is >0.1 wt %.

Embodiment 4: For the crystalline precursor compound: 0.55<z≤0.75 and 0.12≤a≤0.25, and in this embodiment the precursor may have a crystalline size L expressed in nm, with 20≤L≤80.

Embodiment 5: In this embodiment, M' is Co and k=0, 0<x<0.2, 0.60<z<0.75.

Embodiment 6: In this embodiment, $M'=Co_cAl_d$ with 0.75≤c≤0.95, c+d=1.00, and y=0, k=0, 0<x<0.2 and 0.75<z<0.90.

Embodiment 7: In this embodiment, the amount of Ni atoms on the Li 3a octahedral sites may be at least 4%, and preferably >6%.

In general, each of the individual product embodiments described hereabove can be combined with one or more of the product embodiments described before it.

Viewed from a second aspect, the invention can provide the following method embodiments:

Embodiment 8: A method for preparing a positive electrode material having a general formula $Li_{1+a'}M_{1-a'}O_2$, with $M=(Ni_z(Ni_{1/2}Mn_{1/2})_yM'_x)_{1-k}A_k$, wherein x+y+z=1, 0<x≤0.2, 0.55<z≤0.90, M' is either one or both of Co and Al, A is a dopant, 0≤k≤0.1 and 0.01≤a'≤0.10, comprising the steps of:
- providing a M-based precursor prepared from the co-precipitation of metal sulphates with a base;
- mixing the M-based precursor with either one of LiOH and $LiOH.H_2O$, thereby obtaining a first mixture, whereby the Li to transition metal ratio in the first mixture is between 0.60 and 0.90,
- sintering the first mixture in an oxidizing atmosphere at a temperature between 750 and 850° C., for a time between 8 and 36 hrs, thereby obtaining a lithium deficient precursor powder,
- mixing the lithium deficient precursor powder with either one of LiOH and $LiOH.H_2O$, thereby obtaining a second mixture,
- sintering the second mixture in an oxidizing and $CO_2$-free atmosphere at a temperature between 750 and 950° C., for a time between 6 and 36 hrs. The method is suitable for preparing positive electrode material at an industrial scale, by using for example a belt furnace carrying trays holding each at least 3 kg of reactants.

Embodiment 9: In this method embodiment, the Li to transition metal ratio in the first mixture is between 0.75 and 0.90.

Embodiment 10: The methods according to the invention may use the lithium deficient precursor powder described before.

Embodiment 11: In this method embodiment, the first mixture is sintered in dry air, and the second mixture is sintered in oxygen.

Embodiment 12: It may also be that the second mixture is sintered at a temperature between 775 and 850° C., for a time between 8 and 12 hrs.

Each of the individual method embodiments described hereabove can be combined with one or more of the method embodiments described before it.

Viewed from a third aspect, the invention can provide the following electrode material embodiments:

Embodiment 13: A positive electrode material having a general formula $Li_{1+a'}M_{1-a'}O_2$, with $M=(Ni_z(Ni_{1/2}Mn_{1/2})_yM'_x)_{1-k}A_k$, wherein x+y+z=1, 0<x≤0.2, 0.55<z≤0.90, M' is either one or both of Co and Al, A is a dopant, 0≤k≤0.1 and 0.01≤a'≤0.10, prepared by sintering the crystalline precursor compound according to the invention in an oxidizing $CO_2$- free atmosphere at a temperature T between 750 and 950° C., for a time t between 6 and 36 hrs.

Embodiment 14: A positive electrode material having a general formula $Li_{1+a}M_{1-a}O_2$, with $M=(Ni_z(Ni_{1/2}Mn_{1/2})_y M'_x)_{1-k}A_k$, wherein x+y+z=1, 0<x≤0.2, 0.55<z≤0.90, M' is either one or both of Co and Al, A is a dopant, 0≤k≤0.1 and 0.01≤a'≤0.10, prepared by two successive lithiation reactions, wherein the first lithiation reaction yields the precursor compound according to the invention, and the second lithiation reaction is performed in a $CO_2$-free atmosphere.

Embodiment 15: A positive electrode material having a general formula $Li_{1+a}M_{1-a}O_2$, with $M=(Ni_z(Ni_{z}(Ni_{1/2}Mn_{1/2})_yM'_x)_{1-k}A_k$, wherein x+y+z=1, 0<x≤0.2, 0.55<z≤0.90, M' is either one or both of Co and Al, A is a dopant, 0≤k≤0.1 and 0.01≤a'≤0.10, prepared by two successive lithiation reactions, wherein the first lithiation reaction yields an intermediate compound that is lithium deficient versus the positive electrode material, and the second lithiation reaction is performed in a $CO_2$-free atmosphere.

In each of these electrode material embodiments, the $Li_2CO_3$ content can be <0.4 wt %.

Viewed from a fourth aspect, the invention can provide the use of the crystalline precursor powder according to the invention for manufacturing a positive electrode material according to the third aspect of the invention. For example, an embodiment may provide the use of a crystalline compound for manufacturing a lithium transition metal based oxide powder usable as an active positive electrode material in lithium-ion batteries, wherein the crystalline compound has a general formula $Li_{1-a}((Ni_z(Ni_{1/2}Mn_{1/2})_yM'_x)_{1-k}A_k)_{1+a}O_2$, wherein x+y+z=1, 0<x≤0.2, 0.55<z≤0.90, M' is either one or both of Co and Al, A is a dopant, 0≤k≤0.1, and 0.05≤a≤0.40, wherein the compound has an integrated intensity ratio I003/I104<1, with I003 and I104 being the peak intensities of the Bragg peaks (003) and (104) of the XRD pattern of the compound.

BRIEF DESCRIPTION OF THE DRAWINGS

FIG. 7: XRD patterns of E1p and E1a.

DETAILED DESCRIPTION

Figure 1:
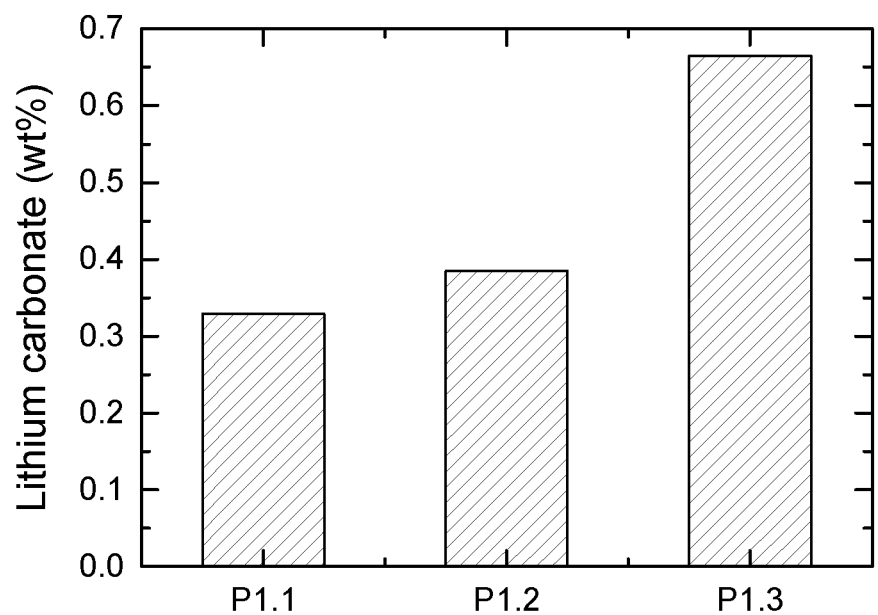
FIG. 1: lithium carbonate content of P1.1, P1.2 and P1.3 measured by pH titration.

Description of Test Conditions a) Coin Cell Test

The final NMC materials produced by the double firing method according to the invention are electrochemically tested at a small scale in a coin cell. The details are as follows: a half-cell (coin cell) is assembled by placing a separator (from Celgard) between the positive electrode and a piece of lithium metal as a negative electrode, and dropping an electrolyte of 1M $LiPF_6$ in EC/DMC (1:2) between separator and electrodes. All the cell tests in the present invention follow the same procedure shown in Table 1. The C-rate is defined as 160 mAh/g. For example, 0.1 C means that the cell will be charged or discharged in 10 hour. "E-Curr" and "V" stands for the end current and cut-off voltage, respectively. At the first cycle, the DQ0.1 C (discharge capacity of the first cycle at a rate of 0.1 C) and IRRQ (irreversible capacity) are determined. The rate performance can be calculated from the subsequent five cycles. The performance of cycle stability is obtained from cycle #7 to #35. The capacity fading at 0.1 C is represented by "$Q_{fade}0.1$ C (%/100)". With DQ7 and DQ34 referring to the discharge capacity of cycle #7 and #34 respectively, the "$Q_{fade}0.1$ C (%/100)" could be obtained through the following formula: (1−(DQ34/DQ7))/27*100*100. This is similar for the capacity fading at 1 C, which is noted as "$Q_{face}1$ C (%/100)". With DQ8 and DQ35 referring to the discharge capacity of cycle #8 and #35 respectively, the "$Q_{face}1$ C (%/100)" could be obtained through the following formula: (1−(DQ35/DQ8))/27*100*100.

TABLE 1 coin cell testing procedure

| | Charge | | | Discharge | | |
|---|---|---|---|---|---|---|
| Cycle # | C-rate | E-Curr | V | C-rate | E-Curr | V |
| 1 | 0.10 | — | 4.3 | 0.10 | — | 3.0 |
| 2 | 0.25 | 0.05 C | 4.3 | 0.20 | — | 3.0 |
| 3 | 0.25 | 0.05 C | 4.3 | 0.50 | — | 3.0 |
| 4 | 0.25 | 0.05 C | 4.3 | 1.00 | — | 3.0 |
| 5 | 0.25 | 0.05 C | 4.3 | 2.00 | — | 3.0 |
| 6 | 0.25 | 0.05 C | 4.3 | 3.00 | — | 3.0 |
| 7 | 0.25 | 0.1 C | 4.5 | 0.10 | — | 3.0 |
| 8 | 0.25 | 0.1 C | 4.5 | 1.00 | — | 3.0 |
| 9-33 | 0.50 | 0.1 C | 4.5 | 1.00 | — | 3.0 |
| 34 | 0.25 | 0.1 C | 4.5 | 0.10 | — | 3.0 |
| 35 | 0.25 | 0.1 C | 4.5 | 1.00 | — | 3.0 | b) pH Titration Test

The soluble base content is a material surface property that can be quantitatively measured by the analysis of reaction products between the surface and water, as is explained in WO2012-107313. If powder is immersed into water a surface reaction occurs. During the reaction the pH of the water increases (as basic compounds dissolve) and the base is quantified by a pH titration. The result of the titration is the "soluble base content" (SBC). The content of soluble base can be measured as follows: 2.5 g of powder is immersed into 100 ml of deionized water and stirred for 10 mins in a sealed glass flask. After stirring to dissolve the base, the suspension of powder in water is filtered to get a clear solution. Then 90 mL of the clear solution is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau with endpoint γ1 (in mL) between pH 8~9 is $OH^-/H_2O$ followed by $CO_3^{2-}/HCO_3^-$, the lower plateau with endpoint γ2 (in mL) between pH 4~6 is $HCO^{3-}/H_2CO_3$. The inflection point between the first and second plateau γ1 as well as the inflection point after the second plateau γ2 are obtained from the corresponding minima of the derivative $d_{pH}/d_{Vol}$ of the pH profile. The second inflection point generally is near to pH 4.7. Results are then expressed in LiOH and $Li_2CO_3$ weight percent as follows:

$$\text{Li}_2\text{CO}_3 \text{ wt }\% = \frac{73.8909}{1000} \times (\gamma_2 - \gamma_1);$$

$$\text{LiOH wt }\% = \frac{23.9483}{1000} \times (2 \times \gamma_1 - \gamma_2).$$

c) PSD-Wet Test

In this description, the laser particle size distribution (PSD) is measured using a Malvern® Mastersizer 2000 with Hydro 2000MU wet dispersion accessory, after dispersing the powder in an aqueous medium. In order to improve the dispersion of the powder in the aqueous medium, sufficient ultrasonic irradiation, typically 1 minute for an ultrasonic displacement of 12, and stirring, are applied and an appropriate surfactant is introduced. Three parameters of this test are used in this invention to describe the particle size distribution, which are D50 (μm), D100 (μm) and <3 μm (%). D50 (μm) refers to the median particle size of the tested sample; D100 (μm) refers to the particle size where 100% of the distribution lies below; <3 μm (%) refers to the percentage below 3 μm. The lithium deficient precursor and final product in this invention are analyzed by PSD-wet in order to check the effect of lithium deficient precursor on the homogeneity of the final product.

d) XRD Test

The current invention observes that the crystalline properties of the lithium deficient sintered precursor are correlated with the soluble base content in the final NMC product and further to the cycle stability of these NMC materials based coin cells. When the crystallinity of the lithium deficient sintered precursor is either too high or too low according to the invention, either the soluble base content will be high in the final product, the reversible electrochemical capacity will be insufficient or the cycling performance is bad. In this invention, the crystallinity of NMC material is evaluated by determining the crystalline size and lattice strain from the X-ray diffraction pattern. The crystalline size L, as a derivation from perfect crystallinity, leads to a broadening of a diffraction peak. It is the same case for strain, which is defined as a deformation of unit cell divided by its length, represented by Δd/d. The non-uniform lattice strain can cause the systematic shifts of atoms and lead to a peak broadening. Thus, through the analysis of the width of individual diffraction peaks, the crystalline size and lattice strain could be obtained.

In "Acta Metallurgica, 1, 22-31 (1953)", Williamson and Hall proposed a method to extract the information on crystalline size and strain from the integral width of diffraction peaks. This method is based on the approximate relationship between Bragg angle (θ) and peak broadening arising from crystalline size and lattice strain, with the following formula:

$$\beta \cos\theta = C\epsilon \sin\theta + \frac{K\lambda}{L},$$

where β represents the integral width of peak, ε is the lattice strain, L is the crystalline size, λ is the radiation wavelength, and C and K are constants, often taken as 4 and 0.9, respectively. By looking at the product of integral width (β) and cos θ as a function of sin θ, the lattice strain and crystalline size can be estimated from the slope and intercept of a fitting line for this formula, respectively. The integral width (β) is the width of a rectangle having the same height (maximum intensity) and area (integrated intensity) of the selected diffraction peak. The area can be approximately integrated by a trapezoidal rule, and the height can be easily obtained from raw data of the diffraction pattern, thus it is feasible to estimate the integral width of each diffraction peak and further determine the crystalline size and lattice stain by this Williamson-Hall (W-H) method.

In this invention, the (003) and (104) peaks are chosen to calculate the crystalline size and strain. The integral width and Bragg angle of diffraction peak (003) are represented by $\beta_1$ and $\theta_1$, while the integral width and Bragg angle of diffraction peak (104) are represented by $\beta_2$ and $\theta_2$. The crystalline size L and lattice strain ε can be obtained from the intercept and slope, by the following formulas:

$$\beta\cos\theta = C\epsilon\sin\theta + \frac{K\lambda}{L},$$

Where the $y_2$ is defined as the product of $\beta_2$ and $\cos \theta_2$, $y_1$ is defined as the product of $\beta_1$ and $\cos \theta_1$. The $x_2$ and $x_1$ are the value of $\sin \theta_2$ and $\sin \theta_1$ respectively. However, this W-H method cannot be used in the case of extremely high Ni excess material, like NCA. This is due to the lithium deficient sintered product of NCA carrying an impurity phase of nickel oxide, which interrupts the calculation of the peak width.

It is known that the structural model of $\text{Li}_{1-a}((\text{Ni}_z(\text{Ni}_{1/2}\text{Mn}_{1/2})_y\text{Co}_x)_{1-k}A_k)_{1+a}O_2$ is the α-NaFeO$_2$ structure (space group R-3m, no. 166) with Li in 3a sites, Ni, Co, and Mn randomly placed on 3b sites, and oxygen atoms on 6c sites (in general an NMC compound can be represented as $[\text{Li}]_{3a}[\text{Ni}_x\text{Co}_y\text{Mn}_z]_{3b}[O_2]_{6c}$). The current invention however observes that the lithium deficient sintered precursor has a phenomenon of cation mixing, meaning that there is a high amount of Ni on Li 3a sites (being the sites within the layers predominantly filled by Li atoms). This differentiates the claimed lithium deficient sintered precursor from the common lithium deficient material obtained during charge/discharge. The latter basically has little cation mixing. Generally, the degree of Li/M disorder can be roughly estimated by the intensity ratio of peak (003) (referred to as I003) to I104 (=intensity of peak (104)), as indicated in "J. Electrochem. Soc. 140 (1993) 1862". A large ratio of I003 to I104 means a low degree of Li/M disorder. A systematic study on cation mixing was described by Jeff Dahn in Solid State Ionics 44 (1990) 87-97. U.S. Pat. No. 6,660,432 B2 gives an extended application of this method to evaluate the degree of Li/M disorder on Li-in excess transition metal oxide material. The idea of this method originates from the fact that the intensity I101 of peak (101) is rapidly attenuated while the combinational intensity of peaks (102) and peak (006) (I102 & I006) are enhanced when Ni atoms occupy "Li sites". Thus, a factor of R is introduced, which represents the ratio of I102&I006 to I101. In Dahn's paper, it is demonstrated that the R factor increases rapidly as x decreases in $\text{Li}_x\text{Ni}_{2-x}\text{O}_2$ material, where 1−x refers to the degree of cation mixing. A formula was deducted to express the relationship between R and x as follows:

$$R = \frac{4}{3} \frac{(1.6-x)^2}{x^2}$$

So the degree of cation mixing (1−x) is equivalent to R, and can be determined from the R value according to the formula.

In this invention, the two methods here above are used to evaluate the degree of cation mixing of the lithium deficient sintered precursors and the final products based on these precursors. The ratio I003/I104 and the value of R will be discussed below. It is observed that the degree of cation mixing is higher in lithium deficient sintered precursor by contrast to the final product. An explanatory example is also given to describe the cation mixing results in lithium deficient material obtained during charge in a normal battery cycling program, which has a similar composition as the lithium deficient sintered precursor of the present invention, but has a clear difference in cation mixing.

This invention observes that the direct sintering method is not applicable for the manufacturing of high Ni-excess NMC material without too much presence of soluble base. Here, high Ni-excess means the amount of Ni excess is greater than 0.55. "Explanatory example 1" shows Ni-excess NMC powders (NMC 622, NMC 7/1.5/1.5 and NMC 811) prepared by direct sintering at small scale, with $Li_2CO_3$ as lithium source and under air atmosphere. All the final NMC powders have a high lithium carbonate content, especially in the case of NMC 811. Thus, the high Ni-excess NMC cannot be manufactured through the direct firing method under the condition of air atmosphere and with $Li_2CO_3$ as lithium precursor. If a preparation at small scale is difficult or impossible then a preparation at larger scale with high thru-put will be hopeless. This is because the reaction includes the creation of $CO_2$ which needs to be carried away by the gas phase; and this kinetic hindrance becomes more severe as the scale increases.

The alternative of using a direct sintering method under $CO_2$-free atmosphere and with LiOH as lithium source, as suggested by the prior art, is also not successful at high thru-put. "Explanatory example 2" compares the direct firing of NMC 811 under different atmospheres (air, synthetic air, $O_2$) and with LiOH as lithium source. It is observed that the NMC 811 material has a relatively low lithium carbonate content when the direct sintering is processed under $CO_2$-free atmosphere. However, when scaling up the production of NMC 811 by directing sintering under $O_2$ flow, the soluble base issue becomes problematic again. As described in the "Explanatory example 3", 2 kg of NMC 811 material is produced through direct sintering under $O_2$ ($CO_2$-free) and with LiOH as precursor. The soluble base content of this NMC 811 material is much higher than in the sample produced in the small scale (30 g). The same issue occurs in the production of NCA material, as illustrated in the "Explanatory example 4". The lithium carbonate content in NMC/NCA material increases when higher quantities of blended precursors are processed in the direct sintering process. Moreover, the high amount of lithium carbonate in the cathode material could lead to a bad cyclability, which is confirmed in "Explanatory example 5". Therefore, the direct sintering method is not an effective method for the large-scale manufacturing of high Ni-excess NMC material, even under the conditions of $O_2$. An alternative processing method is necessary for the large-scale production.

Introduction to Experiments

This invention provides a precursor to prepare high Ni-excess NMC by a double firing method. The double firing means there are two different lithiation reactions in the two steps of sintering. The intention of the first sintering is the preparation of a Li deficient sintered precursor which allows to prepare NMC with high Ni excess like NMC 811 at high tray load and low cost. The mixed transition metal source—like mixed hydroxide—is blended with lithium hydroxide at a Li-deficient stoichiometry, meaning that the ratio of Li:M in the intermediate $LiMO_2$ is less than 1. Then in the second sintering, the lithium deficient precursor is blended with lithium hydroxide in order to correct the ratio of Li:M to the final target composition. In an embodiment, the NMC 811 with low soluble base content is obtained at large scale production through this double firing method which uses a lithium deficient sintered precursor during the $2^{nd}$ firing in a $CO_2$-free atmosphere. Thus, the use of a lithium deficient sintered precursor and applying the double firing method of this invention is an efficient manufacturing way for high Ni-excess NMC.

It should be noted that the lithium deficient sintered precursor cannot be applied as final cathode active material for a rechargeable lithium ion battery since its low lithium to metal ratio would lead to high cation mixing and degrading of the capacity performance of the cell. In Electrochemical and Solid-State Letters, 11-12, A229-A232 (2008), the relationship between cation mixing and capacity performance is further elaborated. The paper states that if I003/I104 is less than 1.2, it means that undesirable cation mixing takes place. Such a material can obviously not be used as a cathode active material in a rechargeable battery, and in this invention such materials are precursor of the cathode active material. The paper further states that the R value (R= ((I102+I006)/I101)) is an indicator of hexagonal order, and very low value for R, such as 0.36, indicates that the lattice has a very good hexagonal order. In the present invention a value for R>0.5 indicates that only precursor materials are claimed.

This invention observes that the properties of the lithium deficient sintered product strongly influence the performance of the final product. The soluble base content of the final product is strongly related to the conditions during $1^{st}$ firing to prepare the lithium deficient sintered precursor. For example, the $1^{st}$ cook firing temperature, sinter time, tray loading and the ratio of lithium to mixed transition metal can be chosen appropriately to obtain a final product of high quality and with a high thru-put. It will also be shown that the crystalline size of the product of the first sintering step has an influence. At a high temperature of the first sintering the crystalline size of the lithium deficient sintered precursor is large and a good crystallization of NMC is achieved with a residual amount of lithium carbonate that is negligible. Since the second sintering utilizes lithium hydroxide as lithium source, and is performed in a $CO_2$-free atmosphere, the final soluble base content is mainly coming from the lithium carbonate in the intermediate product. Thus, a suitable high sintering temperature in the first step could limit the final presence of lithium carbonate. However, a higher temperature means a higher sintering cost. There is no need to utilize a too high temperature, as a too high temperature leads to an overly large crystalline size, which again results in a bad cycling performance. If the sintering temperature is too low then it is difficult to achieve a lithium deficient sintered precursor which has a sufficiently low $Li_2CO_3$—impurity at high thru-put and low cost. To reduce the impurity either less tray loading, longer sintering times or a lower Li:M ratio (the composition of M corresponding to the metal composition in the final product) may be applied, which increases the production cost due to less thru-put, or the need to use more of the more expensive $CO_2$-free air during the second firing step. Also, as will be illustrated in the examples, for a low Li:M ratio—such as 0.4—in the lithium deficient intermediate material, the final material in different parts of the sintered cake show a variation in crystalline size and particle size distribution, leading to a final product that is inhomogeneous, which is thus due to the large amount of lithium source applied during the second sintering. Accordingly, the $Li_2CO_3$ impurity cannot be eliminated by lowering the Li:M ratio to the extreme.

During the preparation of the lithium deficient sintered precursor—i.e. during the first sintering, the blending molar ratio of lithium hydroxide to mixed transition metal hydroxide (Li:M ratio) may be adjusted to avoid too much soluble base appearing in the intermediate product. It has been found that the amount of lithium carbonate in the intermediate product is tiny and almost constant when the Li:M ratio is under a certain threshold limit value. The Li:M ratio may be adjusted according to the optimized sintering temperature and the preference of a short firing time. Based on the above considerations and observations, the optimized Li:M ratio may be in the range of 0.6 to 0.95, or in the range 0.7 to 0.9. During the first sintering, the firing time may also be optimized to guarantee the reaction processing forward to the maximum extent. In an embodiment, the total firing time including heating and cooling is set in the range of 10 to 20 hours for the large-scale production of NMC 811. After the first sintering a lithium deficient sintered precursor is obtained. The precursor has a low content of $Li_2CO_3$ impurity. In an embodiment, it is determined by pH titration that the $Li_2CO_3$ content is <0.4 wt % or even <0.35 wt %. The intermediate product is a single-phase lithium transition metal oxide having an ordered or disordered rocksalt crystal structure. The composition is believed to be $Li_{1-x}M_{1+x}O_2$.

The lithium deficient sintered precursor is used as precursor to prepare a cathode material for rechargeable lithium batteries. The cathode material is a well crystallized lithium transition metal oxide having a higher Li:M ratio than the intermediate powder. The cathode material is prepared by a second sintering process: a blend of the intermediate product and LiOH or $LiOH.H_2O$ is fired in an oxidizing and $CO_2$-free atmosphere, like oxygen. Such $CO_2$-free industrial gases in reality always contain a very small quantity of $CO_2$, about 35 ppm in pure oxygen. An upper limit to the $CO_2$ content in the gas of 50 ppm is realistic.

The following examples illustrate the present invention in more detail.

Explanatory Example 1

This example presents three NMC materials prepared using a direct sintering method at a small scale. NMC 622 powder with the formula $LiNi_{0.4}(Ni_{1/2}Mn_{1/2})_{0.4}Co_{0.2}O_2$ is prepared as follows: a 100 g mixture of $Li_2CO_3$ and MOOH with M=$Ni_{0.4}(Ni_{1/2}Mn1/2)_{0.4}Co_{0.2}$ is homogeneously blended in a vertical single-shaft mixer by a dry powder mixing process. 10 g of the blended powder is loaded in a crucible and sintered at 700° C. for 48 hours under air atmosphere within a box furnace. The small amount of sample and the long firing time ensure that the final product approaches the thermodynamic equilibrium for the given temperature and gas pressures. After sintering, the powder is grinded and ready for the pH titration test. The above produced sample is labelled as NMC P1.1.

Secondly, NMC powders with the formula $LiNi_{0.55}(Ni_{1/2}Mn_{1/2})_{0.3}Co_{0.15}O_2$ (or NMC7/1.5/1.5) and NMC 811 $LiNi_{0.7}(N_{1/2}Mn_{1/2})_{0.2}Co_{0.1}O_2$ are also prepared through similar steps as above, with an adapted MOOH composition. The produced sample with formula $LiNi_{0.55}(Ni_{1/2}Mn_{1/2})_{0.3}Co_{0.15}O_2$ is labelled NNW PI.2, while the one with formula $LiNi_{0.7}(Ni_{1/2}Mn_{1/2})_{0.2}Co_{0.1}O_2$ is labelled NMC PI 0.3.

FIG. 1 presents the pH titration results of these NMC materials, where the weight percentage of lithium carbonate in the final NMC samples is plotted. The three NMC materials have different values of Ni excess: 0.4 for NMC P1.1, 0.55 for NMC P1.2, and 0.7 for NMC P1.3. All the samples are prepared under the same processing conditions. However, the prepared powders have a large distinction in the base content. It is clear that the NMC P1.3 sample has a much higher amount of lithium carbonate than the other two samples. Thus, the NMC P1.3 sample with the very high Ni excess, is difficult to be produced with a low base content, even at such a small scale. As to the other two NMC materials, the lithium carbonate contents are quite smaller, and they have the potential to be manufactured under air at a large scale. Their residual lithium carbonate content is however still too high, and, when applying direct sintering at a large scale, their lithium carbonate contents would be increased to an unacceptable level, so direct sintering under air would not be applicable for large scale production of the high Ni-excess NMC powder, especially for the P1.3 material.

Explanatory Example 2

This example presents the NMC 811 powders produced through a direct sintering method at a small scale, with $LiOH·2H_2O$ as the Li source. The NMC 811 powder with the formula $Li[Ni_{0.7}(Ni_{1/2}Mn_{1/2})_{0.2}Co_{0.1}]O_2$ is prepared as follows: a 100 g mixture of LiOH and MOOH with M=$Ni_{0.7}(Ni_{1/2}Mn_{1/2})_{0.2}Co_{0.1}$ is homogenously blended by a dry powder mixing process. 30 g of the blended powder is then loaded in a crucible and sintered at 810° C. for 12 hours under air atmosphere in a box furnace. After sintering, the powder is grinded and ready for the pH titration test. The above produced sample is labelled P2.1. Other NMC 811 samples are also prepared through the same steps as above, except for the selection of the sintering atmosphere: a second sample is sintered in a synthetic air atmosphere and is labelled P2.2, where the synthetic air is composed of 80% of $N_2$ and 20% $O_2$ (and is free of $CO_2$). A third sample is sintered in a pure $O_2$ atmosphere, and is labelled P2.3.

Figure 2:
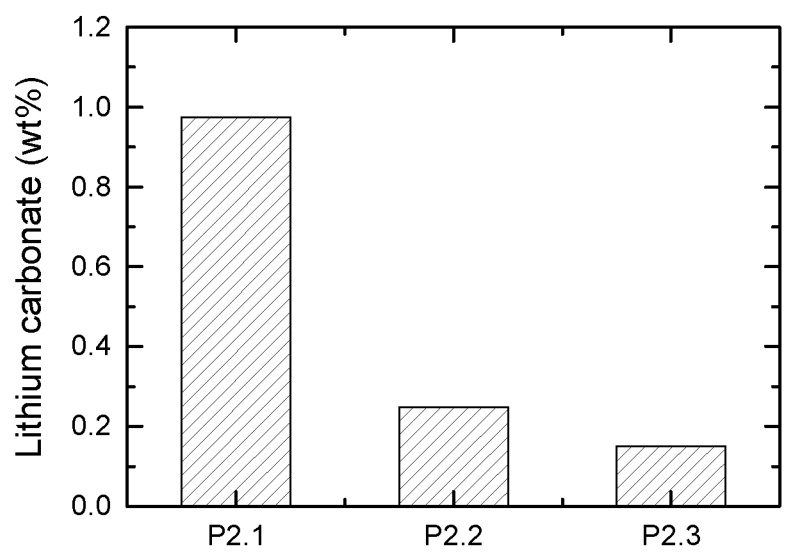
FIG. 2: lithium carbonate content of P2.1, P2.2 and P2.3.

FIG. 2 shows the pH titration results of the three NMC 811 materials, where the weight percentage of lithium carbonate in the final NMC samples is plotted. These three samples are all prepared through direct sintering method at a small scale, and the Li source is LiOH. In the Explanatory example 1 here-above, it is demonstrated that the direct sintering of NMC 811 in air is not possible due to the presence of lithium carbonate in the case of $Li_2CO_3$ being used as Li source. In the P2.1 sample, the Li source is changed to LiOH, however, there is no noticeable improvement of the soluble base content. Thus, even with LiOH as precursor, the NMC 811 is not stable to be produced in air.

From FIG. 2, it is clear that the P2.1 sample has a four to five times larger amount of lithium carbonate than the other samples, and the lithium carbonate content in P2.3 and P2.2 samples are quite close. This similarity can be explained by the use of a $CO_2$-free atmosphere during sintering of P2.3 and P2.2 samples. Thus, it is required to supply a $CO_2$-free atmosphere in the direct sintering of NMC 811, in order to avoid to an unacceptable soluble base content.

Explanatory Example 3

This example presents NMC 811 powder prepared through the direct sintering method at large scale. The NMC 811 powder has the formula $Li[Ni_{0.7}(Ni_{1/2}Mn_{1/2})_{0.2}Co_{0.1}]O_2$ and is prepared as follows: LiOH·2H$_2$O and MOOH with M=Ni$_{0.7}$(Ni$_{1/2}$Mn$_{1/2}$)$_{0.2}$Co$_{0.1}$ are homogenously blended in a Henschel Mixer® for 30 mins by a dry powder mixing process. 2 kg of the powder mixture is sintered at 830° C. for 12 hours under an O$_2$ atmosphere in a chamber furnace. After sintering, the sintered cake is crushed, classified and sieved so as to obtain a non-agglomerate NMC powder. The above sintered NMC 811 power is labelled P3. The pH titration of final P3 product shows the lithium carbonate content to be 0.453 wt %, which is considered too high to obtain a good cycling performance, since high soluble base contents generally lead to poor cyclability. The Explanatory Example 2 above shows a small amount of lithium carbonate impurity during a small-scale direct-sintering production of NMC 811 under O$_2$ atmosphere. However, when the product is scaled up to 2 kg, the performance deteriorates. This indicates that the direct sintering method is not applicable to a mass production of NMC 811 (Ni excess=0.7), even under O$_2$ atmosphere and taking LiOH as precursor. Another method has to be developed for the mass production of high Ni-excess NMC without too much soluble base.

Explanatory Example 4

This example presents cathode materials having the formula LiNi$_{0.8}$Co$_{0.15}$Al$_{0.05}$O$_2$ (NCA), which are prepared through a direct sintering method as follows: LiOH·2H$_2$O, Ni$_{0.85}$Co$_{0.15}$OOH and Al$_2$O$_3$ are homogenously blended in a Henschel Mixer® for 30 mins by a dry powder mixing process. 1.5 kg of the powder mixture is sintered at 775° C. for 12 hours under an O$_2$ atmosphere in a chamber furnace. After sintering, the sintered cake is crushed, classified and sieved so as to obtain a non-agglomerate NMC powder. The above produced material is called P4.1. By increasing the tray loading (the loading weight of blended powder in the tray) of P4.1 to 2 kg and 3 kg, we obtain P4.2 and P4.3 samples, respectively.

Figure 3:
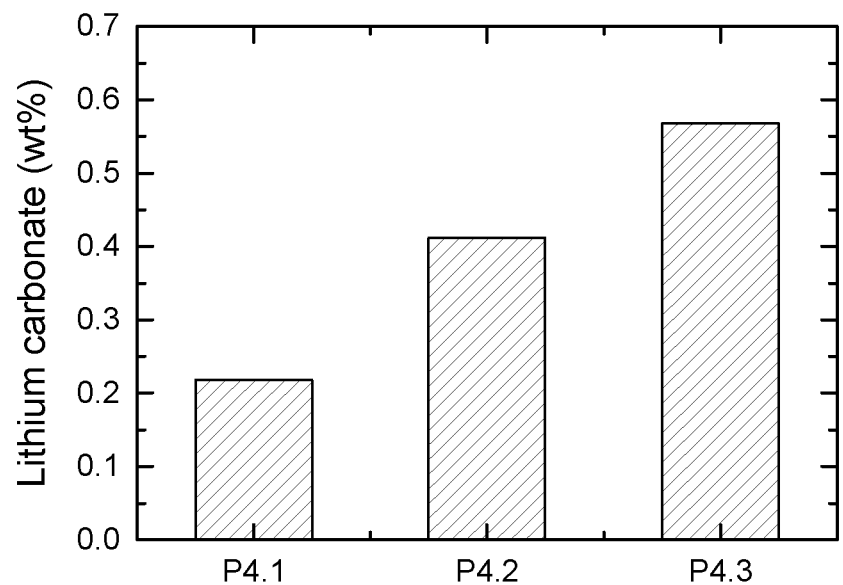
FIG. 3: lithium carbonate content of P4.1, P4.2 and P4.3.

FIG. 3 shows the lithium carbonate content in these three samples. P4.3 has the largest amount of lithium carbonate while P4.1 contains the smallest amount. It is observed that the lithium carbonate content rises with increasing tray loading. From 1.5 kg to 2 kg of tray loading, the lithium carbonate content is doubled. The throughput of P4.1 and P4.2 is quite small due to the low tray loading. For a normal tray loading, like 3 kg per tray in P4.3, the sintered product contains 0.57 wt % of lithium carbonate, which generally indicates a poor cycling performance. Thus, direct sintering of Al-doped Li[Ni$_{0.85}$Co$_{0.15}$]O$_2$ is not feasible for large scale application, even with LiOH as precursor and under oxygen conditions.

Explanatory Example 5

This example presents cathode materials having the formula Li[Ni$_{0.85}$Al$_{0.15}$]O$_2$, which are prepared through the same process as NMC P4.1, except that the sintering temperature is changed to 850° C. The sample is labelled P5. Table 2 summarizes the pH titration and coin cell performance of NMC P5. The coin cell based on this cathode material is tested following the schedule described before. After 25 cycles, the capacity fading at 0.1 C is around 0.2% and the capacity fading at 1 C is around 0.3%. This means the cyclability is poor. At the same time, the lithium carbonate content of NMC P5 is relatively high (>0.3 wt %), and this high soluble base content generally leads to a poor cyclability.

TABLE 2 pH titration and coin cell performance of NMC P5

| Sample | Li$_2$CO$_3$ (wt %) | DQ1 (mAh/g) | Q$_{fade}$0.1 C (%/100) | Q$_{fade}$1 C (%/100) |
|---|---|---|---|---|
| P5 | 0.376 | 167.78 | 20.21 | 32.44 |

Example 1

A NMC powder having the formula LiMO$_2$ with M=Ni$_{0.7}$(Ni$_{1/2}$ Mn$_{1/2}$)$_{0.2}$Co$_{0.1}$ is manufactured at a large-scale from a lithium deficient sintered precursor through the following steps:

1) 1$^{st}$ blending: To obtain a target composition for a lithium deficient precursor Li$_{0.95}$M$_{1.05}$O$_2$ with M=Ni$_{0.7}$(Ni$_{1/2}$ Mn$_{1/2}$)$_{0.2}$Co$_{0.1}$, 4 kg of LiOH·2H$_2$O and MOOH with M=Ni$_{0.7}$(Ni$_{1/2}$ Mn$_{1/2}$)$_{0.2}$Co$_{0.1}$ are homogeneously blended in correct proportions by a Henschel Mixer® for 30 mins.

2) 1st sintering: 3.5 kg of the mixture from the first blending step is loaded in a tray, and then sintered at 825° C. for 10 hours under dry air within a pilot-scale equipment. The dry air is pumped into the sintering equipment at a flow of 40 L/min. After sintering, the sintered cake is crushed and ready for the second blending step. The product obtained from the 1$^{st}$ sintering step is the lithium deficient sintered precursor, and is labelled E1p.

3) 2$^{nd}$ blending: The lithium deficient sintered precursor obtained in step 2 is blended with 10 mol % LiOH to correct the Li stoichiometry in the intermediate product to the final target composition of Li(Ni$_{0.7}$(Ni$_{1/2}$Mn$_{1/2}$)$_{0.2}$Co$_{0.1}$)O$_2$. The blending is done by a Henschel Mixer® for 30 mins.

4) 2$^{nd}$ sintering: The mixture from step 3) is loaded in a tray and cut into small squares, and then sintered at 845° C. for 12 hours under oxygen within a pilot-scale equipment. The oxygen gas is pumped into the sintering equipment at a flow of 1.5 L/min. 5) Post-treatment: After sintering, two small cubes of sintered cake are randomly selected and taken out for a comparative test. The rest of the sintered cake is crushed, classified and sieved so as to obtain a non-agglomerate powder. The NMC samples of the above selected sintered cake are labelled E1a and E1b.

Counterexample 1

A NMC powder having the formula LiMO$_2$ with M=Ni$_{0.7}$(Ni$_{1/2}$ Mn$_{1/2}$)$_{0.2}$Co$_{0.1}$ is manufactured at a large-scale through the steps in Example 1, except that the lithium to metal ratio of the lithium deficient sintered precursor is low, as the blending molar ratio of Li to M is 0.4. The lithium deficient precursor is labelled C1p. As in Example 1, after final sintering, two small cubes of sintered cakes are randomly selected and taken out for further testing. The NMC samples of the above selected sintered cake are labelled C1a and C1b.

Counterexample 2

A NMC powder having the formula LiMO$_2$ with M=Ni$_{0.7}$(Ni$_{1/2}$ Mn$_{1/2}$)$_{0.2}$Co$_{0.1}$ is manufactured at a large-scale through the steps in Example 1, except that the first sintering temperature is low, namely 700° C. The precursor is labelled C2p. As in Example 1, after final sintering, two small cubes of sintered cakes are randomly selected and taken out for further testing. The NMC samples of the above selected sintered cake are labelled C2a and C2b.

Performance of Example 1, Counterexamples 1 & 2 and Discussion

Table 3 summarizes the crystalline size, particle size distribution and lithium carbonate content of the samples in the previous examples, both for the lithium deficient sintered precursor and the final products.

TABLE 3

Performance of NMC samples in Example 1 & Counterexamples 1&2

| Sample | Cryst Size L (nm) | $Li_2CO_3$ (wt %) | <3 μm (%) | D50 (μm) | D100 (μm) |
|---|---|---|---|---|---|
| E1p | 75.42 | 0.32 | 0.000 | 12.900 | 41.190 |
| E1a | — | 0.139 | 0.000 | 13.740 | 43.960 |
| E1b | — | 0.150 | 0.000 | 13.460 | 44.830 |
| C1p | 13.54 | 0.23 | 0.094 | 13.485 | 50.532 |
| C1a | — | 0.163 | 1.600 | 17.988 | 72.206 |
| C1b | — | 0.126 | 0.021 | 13.205 | 50.532 |
| C2p | 17.99 | 0.53 | 0.805 | 12.821 | 50.532 |
| C2a | — | 0.289 | 0.000 | 12.800 | 44.870 |
| C2b | — | 0.499 | 0.020 | 12.810 | 50.530 |

As described above, all the final NMC products are prepared through the double firing method, the sole difference among them is the kind of lithium deficient sintered precursor used for the $2^{nd}$ firing:

a) When the molar ratio of lithium to carbon is low, like 0.4 in "Counterexample 1", the lithium carbonate contents of C1a and C1b are very low, similar to the values in E1a and E1b. However, when looking at the PSD results of the final products, they are distinct. The <3 μm (%), D50 and D100 values of E1a and E1b are quite similar, but the values of C1a and C1b are quite different. The D100 of C1a is at approx. 72 μm while C1b has a value of approx. 50 μm. The D50 of C1a is around 18 μm while the value of C1b is around 13 μm. The particle size distribution of C1a and C1b are thus quite different, which is not acceptable for a large-scale operation.

Figure 4:
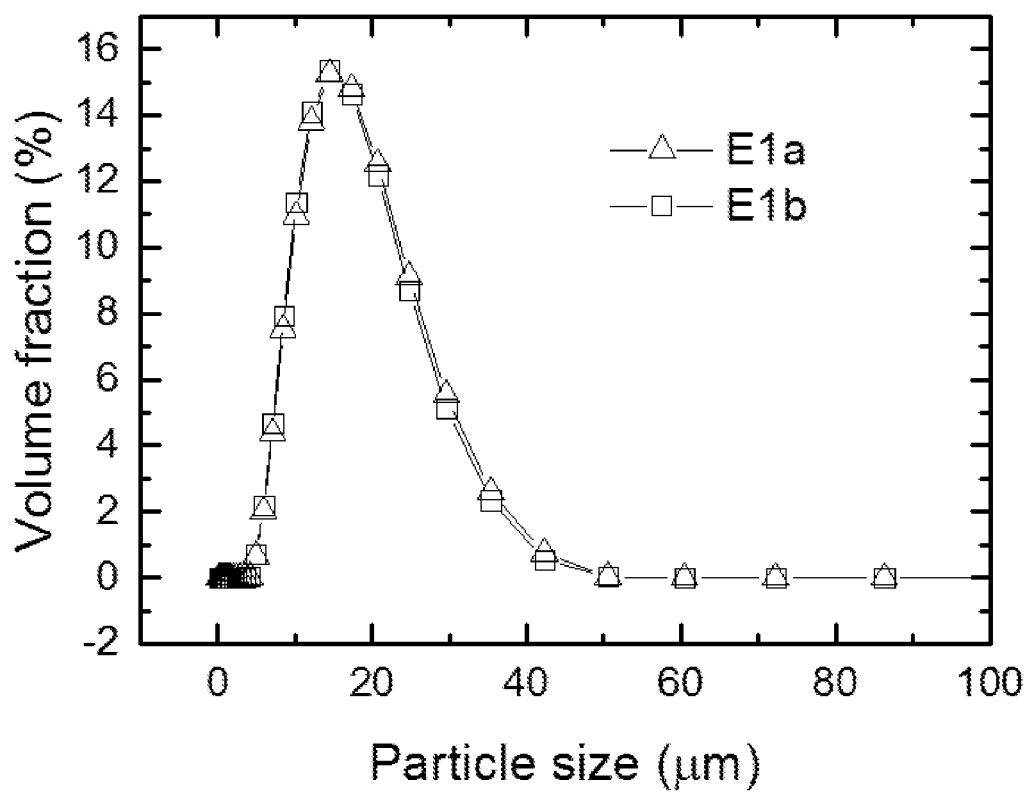
FIG. 4: PSD pattern of E1a and E1b.
Figure 5:
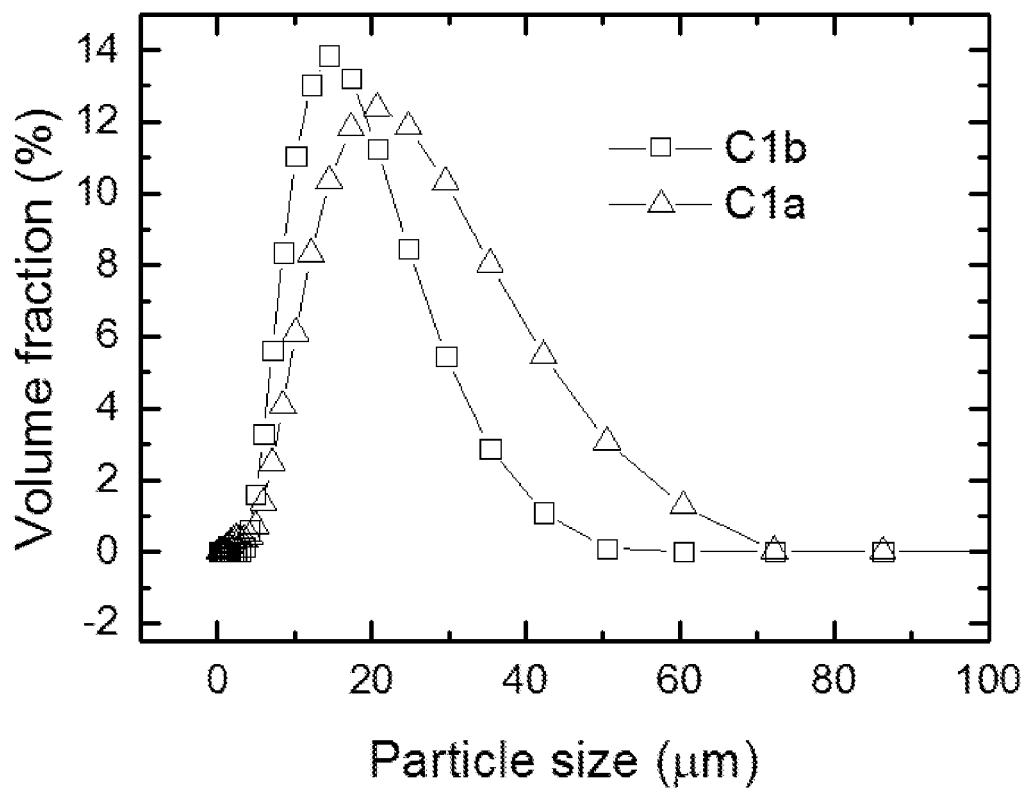
FIG. 5: PSD pattern of C1a and C1b.
Figure 6:
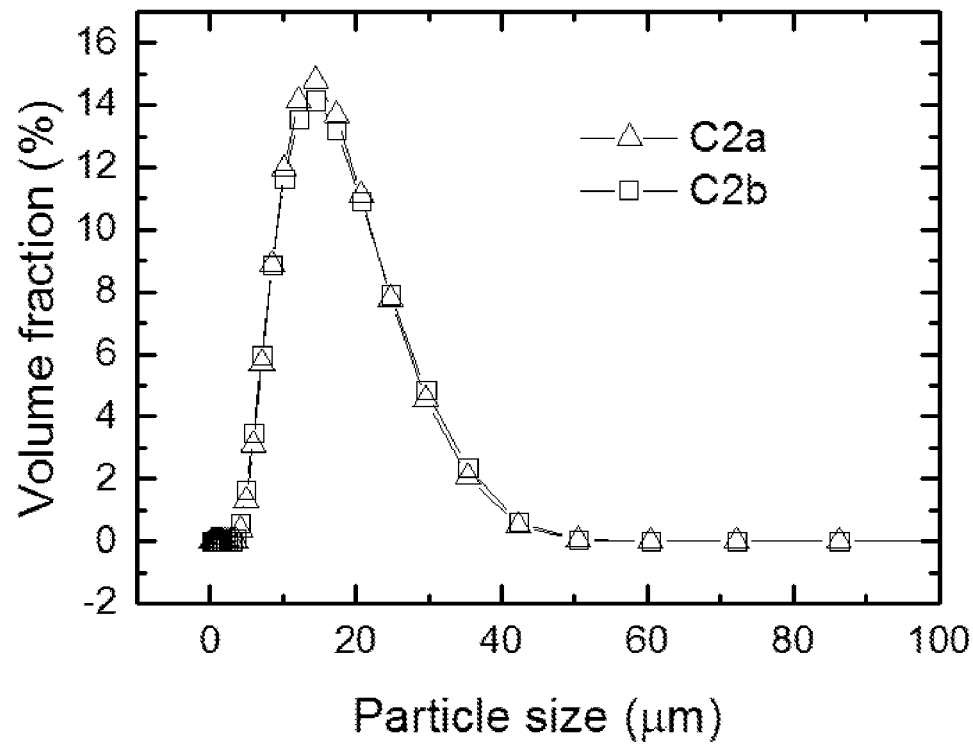
FIG. 6: PSD pattern of C2a and C2b.

FIG. 4 shows the PSD patterns of E1a and E1b: the volume fraction is plotted as a function of particle size. FIG. 5 shows the PSD patterns of C1a and C1b, and FIG. 6 those of C2a and C2b. When comparing these figures, the big gap between C1a and C1b in FIG. 5 is evident, compared to the high PSD consistency between the two final products in FIGS. 4 and 6. This confirms our observation of the PSD parameters in Table 3. The different performance of C1a and C1b indicates the inhomogeneous sintering during the second cook. Since the sole difference between "Example 1" and "Counterexample 1" is the molar ratio of lithium to metal in the $1^{st}$ cook, this inhomogeneous phenomenon is due to the low Li:M ratio, which requires a relatively large amount of Li source to correct the stoichiometry of Li, promoting the diffusion and evaporation of Li ions from the sintered cake during the $2^{nd}$ cook, and finally causing the big difference in particle size of the final product. Accordingly, in order to avoid this inhomogeneous phenomenon, it is necessary to obtain lithium deficient sintered precursor with a Li:M ratio according to the invention.

b) The different sintering temperature during the $1^{st}$ cook results in a variation of crystalline size of the lithium deficient precursors. At the sintering temperature according to the invention, the NMC E1p intermediate sample has a relatively large crystalline size of 75.42 nm. When decreasing the sintering temperature by 125° C., the C2p intermediate sample has a much smaller crystalline size of 17.99 nm. The decrease in crystalline size follows the lowering of the sintering temperature, however, the lithium carbonate content in the corresponding final NMC products follows an inverse trend. The lithium carbonate content is reduced for a high first sintering temperature: final products E1a and E1b have a much lower lithium carbonate content than C2a and C2b.

Figure 7:
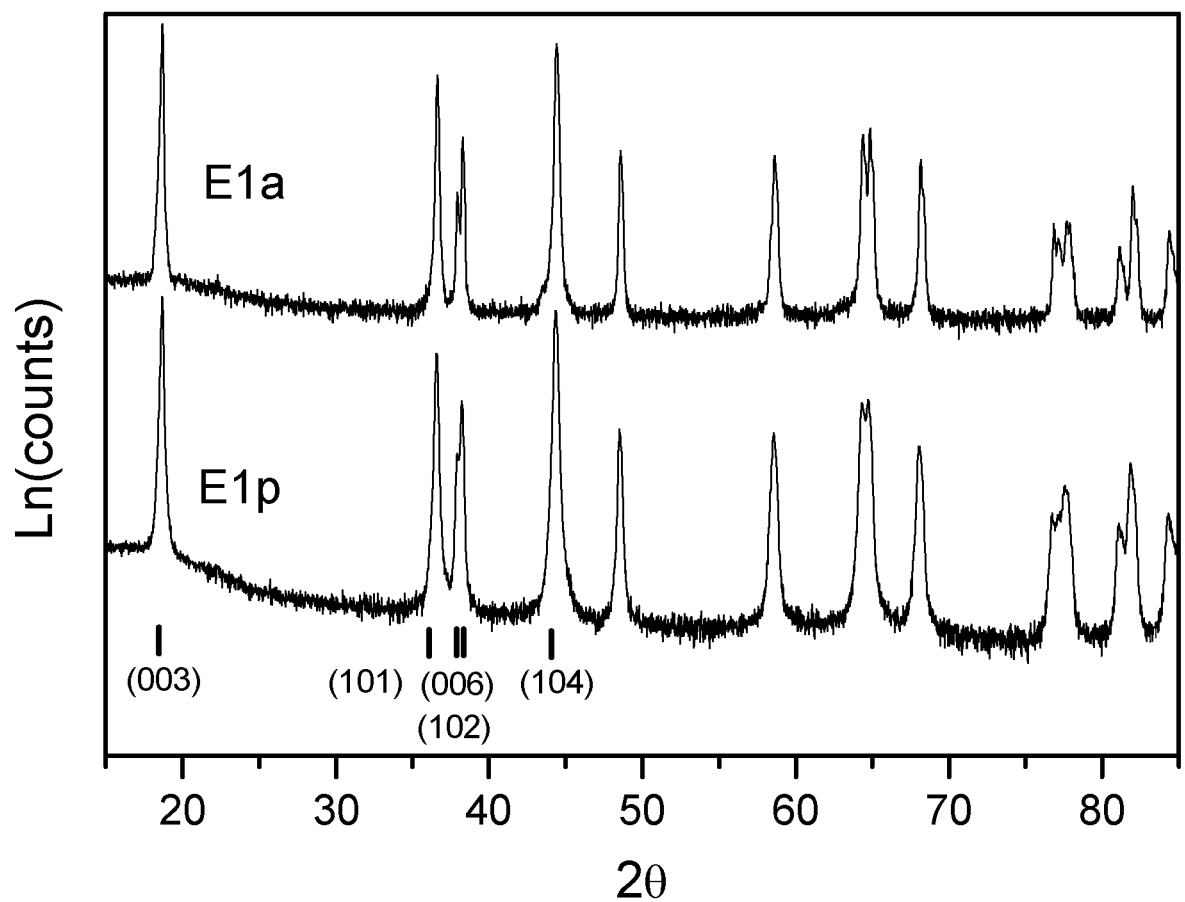

FIG. 7 shows the XRD patterns of E1p and E1a. The Bragg peaks (103), (101), (104) and doublet peak (006, 102) are indicated. Based on the intensity of these peaks, Table 4 summarizes the ratio of I003/I104 and R factor of the NMC E1p and NMC E1a samples. The XRD pattern of these two samples are also analyzed through Rietveld refinement, and the results such as the percentage of Ni on Li sites, cell volume and $R_{bragg}$, are summarized in Table 4. $R_{bragg}$ represents the reliability of the refinement, where a small $R_{bragg}$ value means a good fitting performance. The $R_{bragg}$ of samples E1p and E1a are 2.078 and 2.743 respectively, which values are small enough to confirm that the refinement on these two samples is reliable.

TABLE 4

XRD results for E1p and E1a

| Sample | I003/I104 | R factor | Ni on Li site (%) | Cell vol (Å³) | $R_{Bragg}$ |
|---|---|---|---|---|---|
| E1p | 0.9 | 0.61 | 7.35 | 101.91 | 2.078 |
| E1a | 1.05 | 0.42 | 2.10 | 101.46 | 2.743 |

As described above, the ratio of I003/I104 reflects the degree of Li to transition metal disorder. A large value of I003/I104 indicates a small degree of distortion. The precursor sample NMC E1p has a small I003/I104 ratio, which means there is more cation mixing in NMC E1p and more Ni on the Li sites. The same observation can be made when comparing the R factor. The lithium deficient sintered precursor has a higher R factor by contrast to the final product. As discussed in Dahn's paper mentioned above, a high R factor means a high disordering of Li and transition metals. Thus, the higher value of R in NMC E1p confirms that there is a higher percentage of Ni on Li sites in the lithium deficient sintered precursor. The refinement results also show the same conclusion. The percentage of Ni on Li for NMC E1p is much higher than for NMC E1a. Thus, the lithium deficient sintered precursor has a higher degree of cation mixing, which is quite distinguishable from the lithium deficient sample obtained during charge/discharge.

Figure 8:
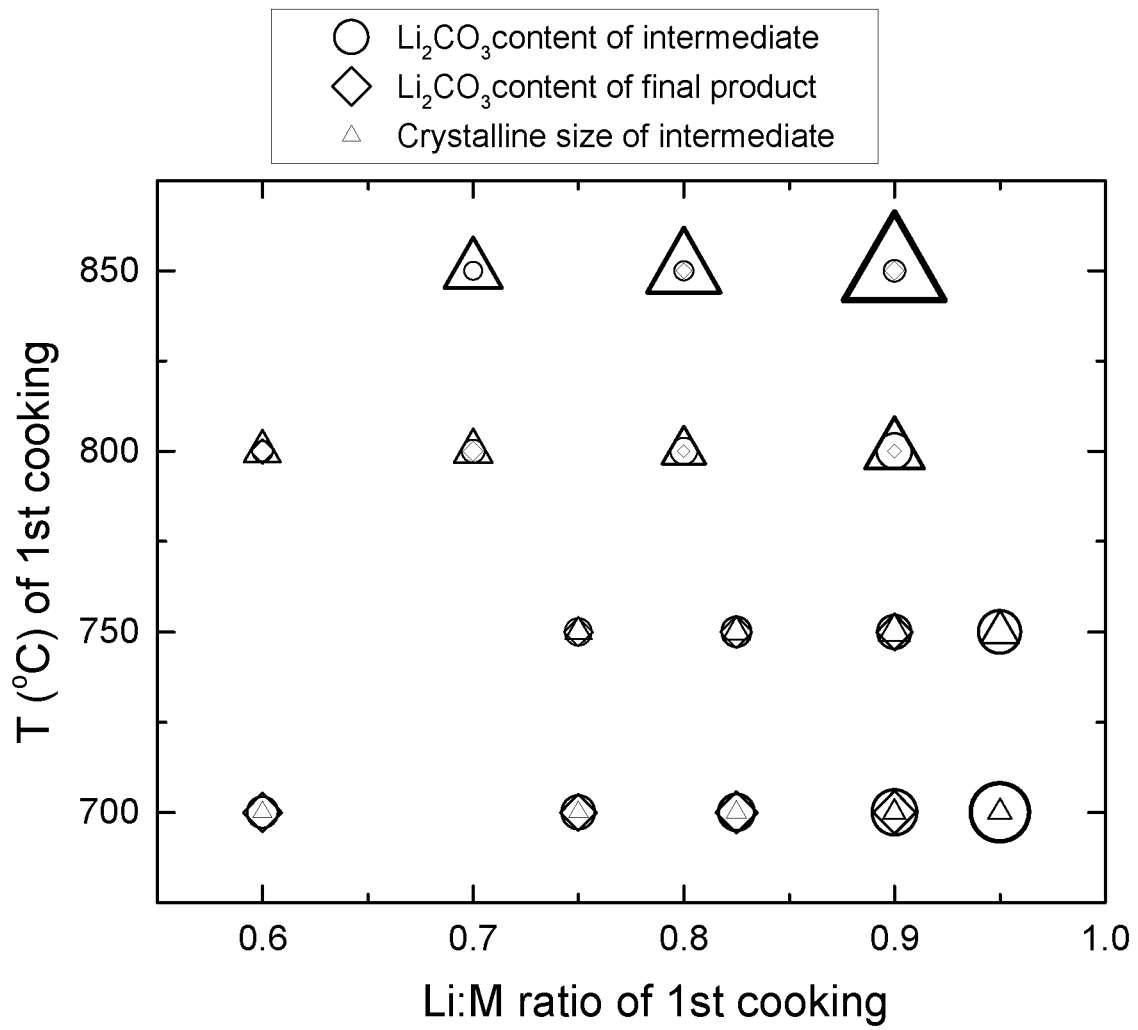
FIG. 8: thermodynamics study of NMC 811 sample prepared through double firing method.

As was discussed before, in order to reduce the lithium carbonate content in the final NMC 811 product, it is necessary to obtain a lithium deficient sintered precursor with high crystallinity. A detailed study of this dependency is shown in FIG. 8, illustrating the lithium carbonate content and crystalline size of lithium deficient sintered precursors sintered at various temperatures and having various lithium to metal ratios during the first cooking. It also shows the lithium carbonate content of the final NMC 811 product based on such lithium deficient sintered precursors. All the samples in this graph are prepared using the double firing method of Example 1, with different first sintering temperatures and Li/M ratios in the first sintering step. In the graph, the circle symbol represents the lithium carbonate content of the lithium deficient intermediate, the triangle symbol represents the crystalline size of the same intermediate, and the diamond symbol represents the lithium carbonate content of the corresponding final NMC product. The size of these symbols stands for the value of the corresponding parameters, i.e. the bigger the size of the symbol, the greater value the parameter has. Table 5 gives info about the data plotted in FIG. 8.

FIG. 8 includes lithium deficient sintered precursors prepared with a molar ratio of lithium to metal from 0.6 to 0.95, as well as a sintering temperature of the first cook from 700 to 850° C. When the molar ratio of lithium to metal is set at 0.9 and the sintering temperature changes from 700 to 850° C., the triangle symbol turns bigger while both circle and diamond symbols become smaller. This indicates that the crystalline size of the lithium deficient sintered precursor increases with increasing temperature, and the lithium carbonate content in both lithium deficient sintered precursor and final product follows an inverse trend. When the molar ratio of lithium to metal has a value different from 0.9, the same temperature dependency of the crystallinity is observed. Accordingly, in order to reduce the lithium carbonate content, it is necessary to obtain a lithium deficient sintered precursor with high crystallinity. It is preferred that the crystalline size L for the chosen composition is between 20 and 80 nm. When the crystalline size of the lithium deficient sintered precursor is too high, the cycle stability is negatively affected. When the crystalline size of the intermediate is too low, the lithium carbonate content in the final product is too high to obtain a good cyclability.

TABLE 5

Crystalline size of lithium deficient sintered precursors depending on Li:M ratio and sintering temperature during 1$^{st}$ cook

| Li:M ratio | T during 1$^{st}$ cook | Crystalline Size L (nm) |
|---|---|---|
| 0.6 | 700° C. | 16.9 |
| 0.75 | | 16 |
| 0.825 | | 16.4 |
| 0.9 | | 18 |
| 0.75 | 750° C. | 20.3 |
| 0.825 | | 22.8 |
| 0.9 | | 28.8 |
| 0.95 | | 40 |
| 0.6 | 800° C. | 21.3 |
| 0.7 | | 32 |
| 0.8 | | 36.3 |
| 0.9 | | 56.4 |
| 0.7 | 850° C. | 46.2 |
| 0.8 | | 61.7 |
| 0.9 | | 74.5 |

As explained in the "Explanatory example 5", the cycle stability is strongly affected by the presence of lithium carbonate in the cathode NMC material. A high lithium carbonate content in the NMC powder leads to a bad cyclability in the NMC-based battery. Thus, in order to avoid bad cycling performance, it is essential to reduce the lithium carbonate content in the final product, and considering the observation above, this means a lithium deficient sintered precursor with high crystallinity is required.

Explanatory Examples 6 to 8

Figure 9:
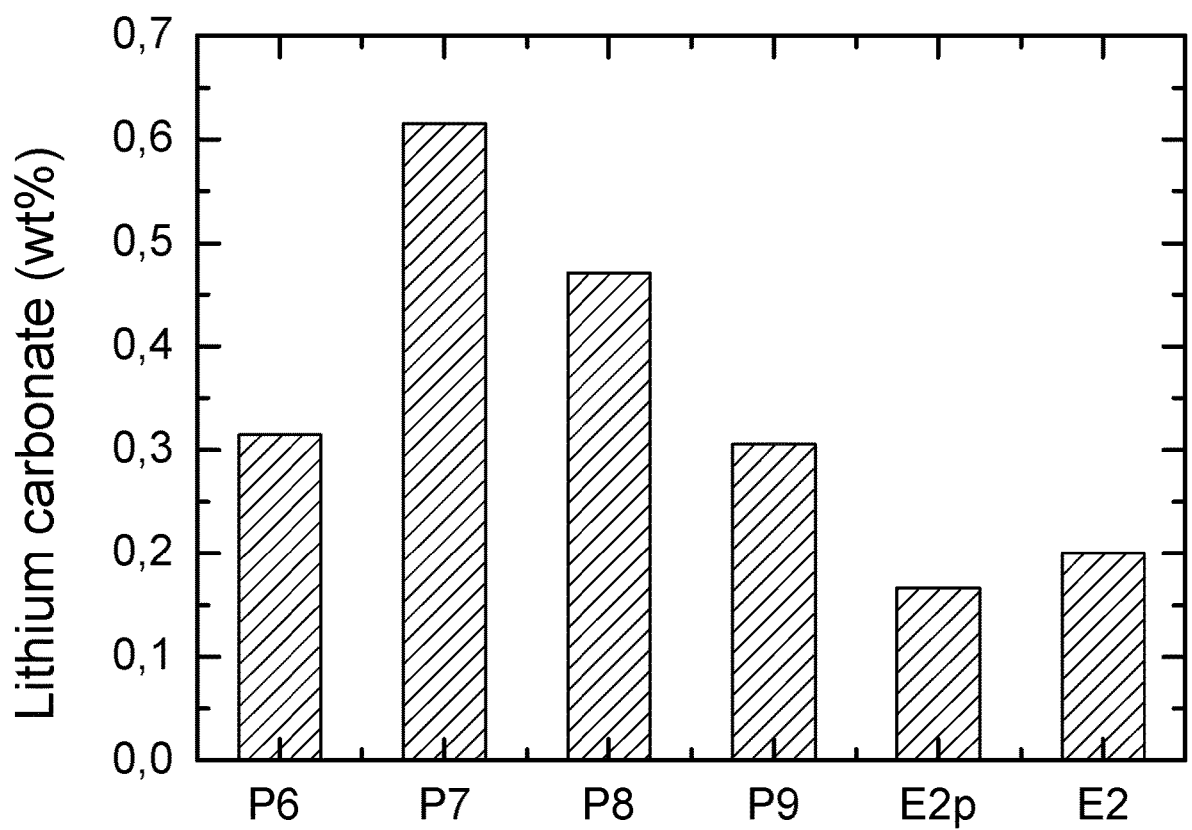
FIG. 9: lithium carbonate content of samples P6-9, E2p and E2.

These examples demonstrate that when LiMO$_2$ with M=Ni$_{0.836}$Co$_{0.147}$Al$_{0.017}$ is prepared under air, then high base contents are observed. The base content is increasing with Li:M ratio. Explanatory examples P6, P7 and P8 are prepared as follows: first, LiOH·H$_2$O, Ni$_{0.85}$Co$_{0.15}$(OH)$_2$ and Al$_2$O$_3$ are mixed so as to achieve a general composition Li$_x$Ni$_{0.836}$Co$_{0.147}$Al$_{0.017}$O$_2$. The value of "x" is adjusted to 0.98, 1.00 and 1.02 for P6, P7 and P8 respectively. The mixtures are then put in trays and fired at 775° C. for 12 h under air flow. The tray loading is very low: 120 g. The resulting product is ground and classified and further characterized by means of base content titrations. The soluble base content is shown in FIG. 9: despite a very low tray loading, the base content significantly increases for Li:M ratios when the product is prepared under air.

Explanatory Example 9

This example will demonstrate that when LiMO$_2$ with M=Ni$_{0.836}$Co$_{0.147}$Al$_{0.017}$ is prepared under O$_2$, a lower base content is obtained. This process has however the disadvantage of low throughput and higher cost due to O$_2$ firing. Explanatory example 9 is prepared as follows: LiOH·H$_2$O, Ni$_{0.85}$Co$_{0.15}$(OH)$_2$ and Al$_2$O$_3$ are mixed so as to achieve a general composition Li$_{1.00}$Ni$_{0.836}$Co$_{0.147}$Al$_{0.017}$O$_2$. The mixture is then put in trays and fired at 775° C. for 12 h under O$_2$ flow. The tray loading is 2.0 kg with a blend density of 0.82 g/cm$^3$. The oxygen flow is 10 m$^3$/h/kg. The resulting product is ground and classified and further characterized by means of base content titrations (see FIG. 9). It is labelled as P9. A relatively low base content is achieved for P9 by contrast to the P6-P8 samples; but the very low blend density of P9 and high O$_2$ flow results in a poor throughput and high overall cost for the firing.

Example 2

This example demonstrates that LiMO$_2$ with M=Ni$_{0.836}$Co$_{0.147}$Al$_{0.017}$ can be prepared using a double firing process according to the invention and resulting in a low lithium carbonate content in the final product. This double firing allows for very high throughput and lower process costs.

1) 1$^{st}$ blending: quantities of LiOH·H$_2$O, Ni$_{0.85}$Co$_{0.15}$(OH)$_2$ and Al$_2$O$_3$ are mixed so as to obtain a general composition Li$_x$Ni$_{0.836}$Co$_{0.147}$Al$_{0.017}$O$_2$. In the example "x" is set at 0.90.

2) 1$^{st}$ sintering: the mixture is put in trays and fired at 775° C. for 12 h under air flow. The tray loading is 3 kg with a blend density of 1.28 g/cm$^3$. The resulting product is then ground and classified and further characterized by means of base content titrations. It is labelled as E2p.

3) 2$^{nd}$ blending: the lithium deficient sintered precursor is blended with additional amounts of LiOH·H$_2$O in order to adjust the composition to Li$_{1.00}$Ni$_{0.836}$Co$_{0.147}$Al$_{0.017}$O$_2$.

4) 2$^{nd}$ sintering: the mixture is then put in trays and fired at 775° C. for 12 h under O$_2$ flow. The O$_2$ flow is 5.7 m$^3$/h/kg of final product, equivalent to 4.0 m$^3$/h/kg of mixture. The O$_2$ flow is therefore 2.5 times lower than in Explanatory example 9. The tray loading is 1.9 kg with a blend density of 1.96 g/cm$^3$.

5) Post-treatment: the resulting product is ground and classified and further characterized by base content titrations (see FIG. 9). It is labelled as E2.

Figure 10:
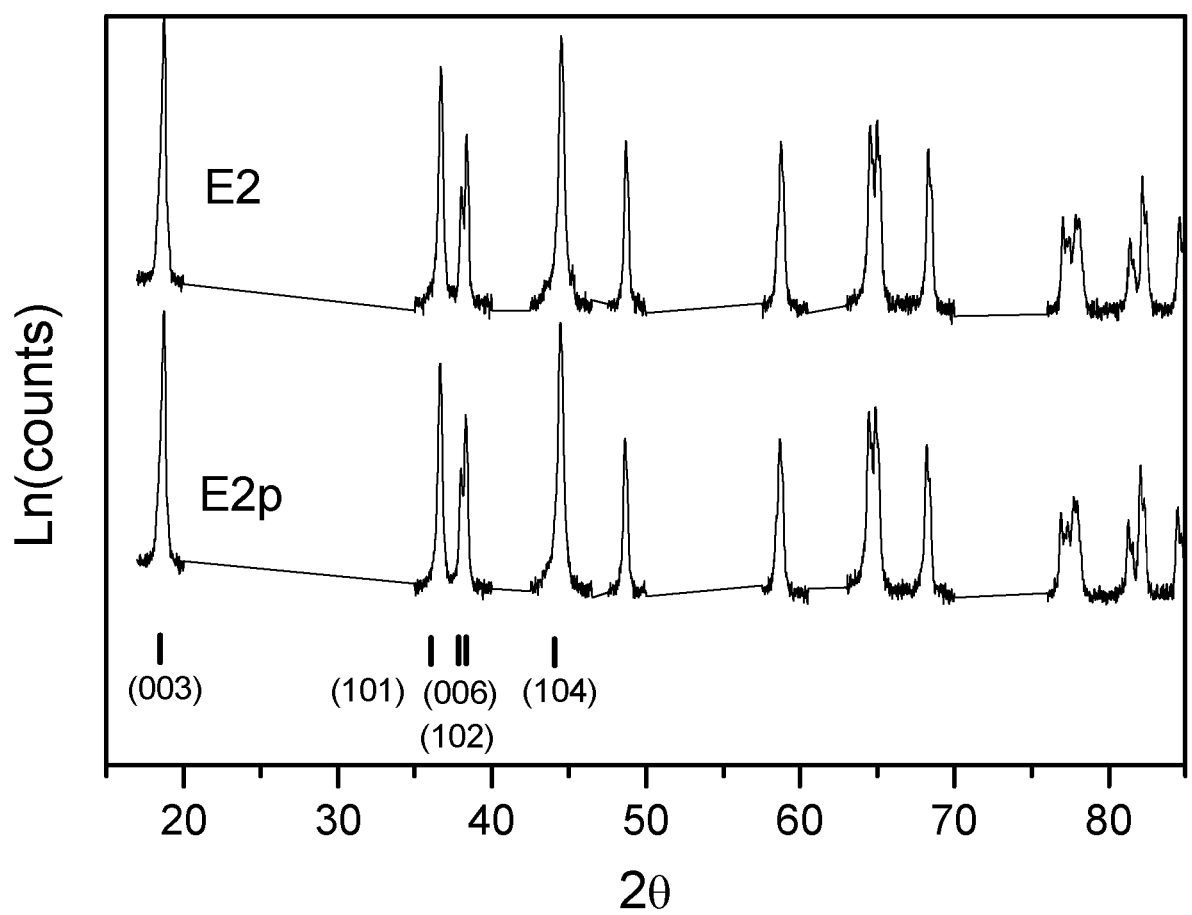
FIG. 10: XRD patterns of E2p and E2.

It was discussed before that the lithium deficient sintered precursor (E1p) showed a different result of cation mixing compared to the final product (E1). This phenomenon is also observed in Example 2. FIG. 10 shows the XRD pattern of the E2p and E2 samples. The Bragg peaks (103), (101), (104) and doublet peak (006, 102) are indicated. Based on the intensity of these peaks, Table 6 summarizes the ratio of I003/I104 and R factor of samples E2p and E2.

TABLE 6

I003/I104 ratio and R factor of Ex 2.

| Sample | I003/I104 | R factor |
|---|---|---|
| NMC E2p | 0.98 | 0.59 |
| NMC E2 | 1.16 | 0.44 |

The ratio of I003/I104 reflects the degree of Li to transition metal disorder. A large value of I003/I104 indicates a small degree of distortion. Looking at the ratio I003/I104 of E2p and E2, it can be concluded that there is more cation mixing in E2p and more Ni on the Li sites. The same observation can be made when comparing the R factor. The lithium deficient sintered precursor has a higher R factor by contrast to the final product. As discussed in Dahn's paper mentioned above, a high R factor means a high disordering of Li and transition metals. Thus, the higher value of R in E2p confirms that there is a higher percentage of Ni on Li sites in the lithium deficient sintered precursor.

Comparison of Explanatory Examples 6-9 and Example 2

The base content of E2p and E2 base is very low compared to P6-P9 as is shown in FIG. 9. In addition, the $O_2$ flow used for the $2^{nd}$ firing of E2 is more than 2 times lower than the $O_2$ flow used for the firing of P9. The two-step process of E2 thus has the advantage of higher throughput and allows for a significant decrease of cost for the second $O_2$ firing step.

Explanatory Example 10

This example will demonstrate that the lithium deficient material is not suitable to be applied as final cathode active material for a lithium ion battery. This is due to a low lithium to metal ratio resulting in high cation mixing and bad capacity performance. A series of $Li_xMO_2$ powders with M=$Ni_{0.7}(Ni_{1/2} Mn_{1/2})_{0.2}Co_{0.1}$ and 0.7<x 1.1 are prepared directly through a one-step firing at a small scale of around 50 g. The dwelling temperature is 845° C. and the material is kept for 12 hours under oxygen at a flow rate of 1.5 L/min. The molar lithium to metal ICP ratio of the final products is 0.76, 0.87, 0.96, 0.99 and 1.08. The samples are labelled P10, P11, P12, P13 and P14, respectively (P12-14 are counterexamples). These powders are used as cathode active material to make coin cells and are electrochemically tested following "Description of test conditions: a) Coin cell test". The powders are also analyzed by XRD test and Ni on Li (%) atomic occupations are refined by Rietveld method through "TOPAS version 3" software. The factors of I003/I104 peak intensities and R are also analyzed according to "Description of test conditions: d) XRD Test".

Table 7 shows XRD results of Ni on Li %, I003/I104 and R factor, and coin cell results of charge (CQ1) and discharge capacity (DQ1) in the first cycle, and the irreversible capacity percentage (Qirr %) resulting from CQ1 and DQ1. From the table, it can be concluded that a low lithium to metal ratio leads to high cation mixing. The sample with Li:M of 0.76 gives the highest degree of cation mixing. For these samples, as cation mixing increases, the capacity DQ1 decreases and Qirr % increases. This is not desirable in practice. Among those products, near stoichiometry samples obtain the best capacity property. Thus, lithium deficient $Li_xMO_2$ powders (M=$Ni_{0.7}(Ni_{1/2} Mn_{1/2})_{0.2}Co_{0.1}$) with a lithium deficiency of 5% or more are not applicable as cathode active materials for lithium ion batteries. Materials with >5% Li deficiency are according to the present invention used as precursors. To these precursors additional lithium is added and an additional firing is performed finally resulting in a cathode material for a rechargeable battery without lithium deficiency.

TABLE 7

Lithium to metal ratio, metal mixing and coin cell data of Explanatory example 10.

| Sample | Li:M (ICP) | Ni on Li (%) | I003/ I104 | R | CQ1 (mAh/g) | DQ1 (mAh/g) | Qirr (%) |
|---|---|---|---|---|---|---|---|
| P10 | 0.76 | 0.168 | 0.7 | 0.9 | 157.05 | 106.14 | 32.43 |
| P11 | 0.87 | 0.095 | 0.86 | 0.64 | 201.65 | 166.74 | 17.31 |
| P12 | 0.96 | 0.045 | 1 | 0.48 | 221.83 | 192.00 | 13.45 |
| P13 | 0.99 | 0.029 | 1 | 0.41 | 227.10 | 199.81 | 12.02 |
| P14 | 1.08 | 0.017 | 1.09 | 0.38 | 219.68 | 191.40 | 12.87 |

The invention claimed is:

1. A crystalline precursor compound for manufacturing a lithium transition metal based oxide powder usable as an active positive electrode material in lithium-ion batteries, the precursor having a general formula $Li_{1-a}((Ni_z(Ni_{1/2} Mn_{1/2})_y M'_x)_{1-k}A_k)_{1+a}O_2$, wherein x+y+z=1, 0<x≤0.2, 0.55<z≤0.75, M' is either one or both of Co and Al, A is a dopant, 0≤k≤0.1, and 0.12≤a≤0.25, wherein the precursor has an integrated intensity ratio I003/I104<1, wherein I003 and I104 are the peak intensities of the Bragg peaks (003) and (104) of the XRD pattern of the crystalline precursor compound, and wherein the precursor has a crystalline size L expressed in nm, with 20≤L≤80.

2. The crystalline precursor compound of claim 1, wherein the precursor has a ratio R of the intensities of the combined Bragg peak (102,006) and the Bragg peak (101) with R=((I102+I006)/I101) and 0.5<R<1.16.

3. The crystalline precursor compound of claim 1, having a $Li_2CO_3$ content <0.4 wt %.

4. The crystalline precursor compound of claim 1, wherein M' is Co and k=0, 0<x<0.2, 0.60<z<0.75.

5. The crystalline precursor compound of claim 1, wherein M'=$Co_cAl_d$ with 0.75≤c≤0.95, c+d=1.00, and y=0, k=0, and 0<x<0.2.

6. The crystalline precursor compound of claim 1, wherein the amount of Ni atoms on the Li 3a octahedral sites is at least 4%.

7. A method for preparing a positive electrode material having a general formula $Li_{1+a'}M_{1-a'}O_2$, with M=$(Ni_z(Ni_{1/2} Mn_{1/2})_y M'_x)_{1-k}A_k$, wherein x+y+z=1, 0<x≤0.2, 0.55<z≤0.90, M' is either one or both of Co and Al, A is a dopant, 0≤k≤0.1 and 0.01≤a'≤0.10, comprising:
    providing a M-based precursor prepared from the co-precipitation of metal sulphates with a base;
    mixing the M-based precursor with either one of LiOH and $LiOH.H_2O$, thereby obtaining a first mixture, whereby the Li to transition metal ratio in the first mixture is between 0.60 and 0.90,
    sintering the first mixture in an oxidizing atmosphere at a temperature between 750 and 850° C., for a time between 8 and 36 hrs, thereby obtaining a lithium deficient precursor powder,
    mixing the lithium deficient precursor powder with either one of LiOH and $LiOH.H_2O$, thereby obtaining a second mixture,
    sintering the second mixture in an oxidizing and $CO_2$-free atmosphere at a temperature between 750 and 950° C., for a time between 6 and 36 hrs.

8. The method according to claim 7, wherein the Li to transition metal ratio in the first mixture is between 0.75 and 0.90.

9. The method according to claim 7, wherein the lithium deficient precursor powder has a general formula $Li_{1-a}((Ni_z(Ni_{1/2}Mn_{1/2})_y M'_x)A_k)_{1+a}O_2$, wherein $x+y+z=1$, $0<x<0.2$, $0.55<z\leq0.75$, M' is either one or both of Co and Al, A is a dopant, $0\leq k\leq 0.1$, and $0.12\leq a\leq 0.25$, wherein the precursor has an integrated intensity ratio I003/I104<1, wherein I003 and I104 are the peak intensities of the Bragg peaks (003) and (104) of the XRD pattern of the crystalline precursor compound, and wherein the precursor has a crystalline size L expressed in nm, with $20\leq L\leq 80$.

10. The method according to claim 7, wherein the first mixture is sintered in dry air, and the second mixture is sintered in oxygen.

11. The method according to claim 7, wherein the second mixture is sintered at a temperature between 775 and 850° C., for a time between 8 and 12 hrs.

* * * * *